(12) United States Patent
Salsburg

(10) Patent No.: US 8,886,777 B2
(45) Date of Patent: Nov. 11, 2014

(54) MOVING ENTERPRISE SOFTWARE APPLICATIONS TO A CLOUD DOMAIN

(75) Inventor: Michael A. Salsburg, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 359 days.

(21) Appl. No.: 13/152,341

(22) Filed: Jun. 3, 2011

(65) Prior Publication Data

US 2013/0031158 A1   Jan. 31, 2013

(51) Int. Cl.
*G06F 15/16* (2006.01)
*G06F 15/177* (2006.01)
*G06F 15/173* (2006.01)
*G06F 9/50* (2006.01)
*H04L 12/915* (2013.01)

(52) U.S. Cl.
CPC ............ *G06F 9/5072* (2013.01); *G06F 9/5077* (2013.01); *H04L 47/785* (2013.01)
USPC ............ 709/222; 709/203; 709/220; 709/226

(58) Field of Classification Search
CPC .... G06F 9/5072; G06F 9/5077; H04L 47/785
USPC .................................. 709/203, 220, 222, 226
See application file for complete search history.

(56) References Cited

U.S. PATENT DOCUMENTS

| 6,880,002 | B2* | 4/2005 | Hirschfeld et al. | 709/223 |
|---|---|---|---|---|
| 8,514,868 | B2* | 8/2013 | Hill | 370/401 |
| 8,639,747 | B2* | 1/2014 | Seago et al. | 709/203 |
| 2009/0276771 | A1* | 11/2009 | Nickolov et al. | 717/177 |
| 2010/0042720 | A1* | 2/2010 | Stienhans et al. | 709/226 |
| 2010/0269164 | A1* | 10/2010 | Sosnosky et al. | 726/7 |
| 2010/0325199 | A1* | 12/2010 | Park et al. | 709/203 |
| 2010/0333116 | A1* | 12/2010 | Prahlad et al. | 719/328 |
| 2011/0022812 | A1* | 1/2011 | van der Linden et al. | 711/163 |
| 2011/0082935 | A1* | 4/2011 | Zetterman et al. | 709/226 |
| 2011/0126197 | A1* | 5/2011 | Larsen et al. | 718/1 |
| 2011/0209064 | A1* | 8/2011 | Jorgensen et al. | 715/733 |
| 2011/0296021 | A1* | 12/2011 | Dorai et al. | 709/226 |
| 2011/0296023 | A1* | 12/2011 | Ferris et al. | 709/226 |
| 2011/0307523 | A1* | 12/2011 | Balani et al. | 707/802 |
| 2012/0005264 | A1* | 1/2012 | McWhirter et al. | 709/203 |

* cited by examiner

*Primary Examiner* — Hieu Hoang
(74) *Attorney, Agent, or Firm* — James E. Goepel

(57) ABSTRACT

Methods and systems for moving or porting an enterprise software application from an enterprise environment to a cloud domain are disclosed. An automated moving software program identifies enterprise components of an enterprise software application. The program assigns an enterprise component tag to the identified enterprise component. The program then assigns an enterprise attribute tag to the identified enterprise component and searches an attribute relationship map for at least one cloud attribute related to the assigned enterprise attribute. On identification of such a cloud attribute, the cloud attribute is assigned to the identified enterprise component and the enterprise component is converted to cloud component by creating a new cloud component to replicate the functions of the enterprise component or assigning a cloud component tag to the enterprise component, provided the enterprise component is render-able on the cloud domain resources.

16 Claims, 4 Drawing Sheets

MOVING ENTERPRISE SOFTWARE APPLICATIONS TO A CLOUD DOMAIN

TECHNICAL FIELD

The present disclosure relates to a system and method of moving enterprise software application from an enterprise environment to a cloud domain.

BACKGROUND

The term "cloud computing" generally refers to a model that makes computing resources available over a network as services. The network has backend computing devices that handle most of the processing and storage aspects of data generated by a client computer. For purposes of simplicity in this disclosure, "client computers," will herein be referred to as "frontend computing devices." Backend computing devices perform such functions as software application processing, data processing, and data storage, each function related to data generated by frontend computing devices. The backend computing devices connect via networks to a number of frontend computing devices and may share processing functions and storage areas for the data generated from multiple frontend computers. The frontend computing devices typically receive software applications from one or a group of backend computing devices or rely on in-built supporting applications, and a received software application is rendered on the frontend computing device to create a fully functional user interface with a secure communication channel for interacting with the backend computing devices.

Physical computing devices that support cloud computing on the backend typically support virtual computing processes, such as deployment and maintenance of virtual machines (VM) over the physical computing devices. The virtual machines function as a low level interface between any type of operating system (OS) overlying the VM and hardware underlying the VM. This allows any OS, where each OS is supported by different types of file structures, to function on any physical device within the cloud. Virtual software applications deploy on the VM operating system in a cloud environment, and the frontend computing device relies on received images of the virtual software application screen on a support application (e.g., an internet browser) to function as a user-interface.

A user on the frontend computing device interacts with the user interface, thereby creating new application data on the rendered software application. The software application continuously updates the backend computing device with the new application data generated at the user interface. The application data is processed and stored on the backend computing devices, after which it is transmitted for display to the user via the software application of the frontend computing device. The rendered software application is typically a web-enabled software application accessible to the frontend computing device via a supporting application (e.g., a browser like Internet Explorer® or Mozilla Firefox®) or via a web-enabled stand-alone user-interface support application (e.g., a Java based user-interface application). The immediate benefit of cloud computing processes is the decreased dependency of the software application on the physical and operating system capabilities of the frontend computing device.

The performance of the frontend computing devices can be limited by factors that are not significantly dependent on the processing hardware, such as network connectivity and the user-interface application for interacting with the software application. The user-interface software application typically supports client-side and service-side scripting platforms. While client-side and server-side languages may be interchanged in many current web-based applications, some common examples of client-side web applications may include JavaScript and Hypertext Markup Language (HTML), while Java and Perl are typically considered to be server-side scripting languages. A software application created for a cloud environment is typically optimized to function within the requirements of the cloud. Within the cloud environment, provisions for software applications across different VMs for a single business may also lack cross-functional capability in terms of sharing data across software applications, where each software application resides in its own VM.

Many online businesses seek to transfer and customize enterprise software applications from physical computing devices to a cloud environment. Additionally, cloud computing service providers host the software applications and typically charge fees for delivery of software applications to frontend computing devices, where the software application is standardized for all online businesses that use the software application. Online businesses prefer software applications that are customized by developers to extend the functionality by benefiting from being based in a cloud environment. Such functionalities may relate to how the software application utilizes cloud resources, where cloud application software modules control the administration of the cloud domain, including software and hardware provisioning of resources. Customizations require access to the cloud domain, in a programming context, to fully exploit the capabilities of the cloud environment for existing enterprise software applications prior to converting the software application for the cloud.

SUMMARY

The systems and methods described herein overcome the drawbacks discussed above by identifying enterprise components of an enterprise software application and converting select enterprise components to cloud executable components, where the cloud executable components are supported for rendering by hardware aspects of the cloud, as well as, software and virtual cloud components.

In one embodiment, a computer-implemented method for moving an enterprise software application from an enterprise environment to a cloud domain comprises identifying, on a backend computing device, an enterprise component from the enterprise software application; assigning, on the backend computing device, at least one enterprise component tag to each identified enterprise component; assigning, on the backend computing device, at least one enterprise attribute tag to the identified enterprise component; identifying, on the backend computing device, at least one cloud attribute for the enterprise attribute, wherein the cloud attribute shares a predefined relationship with the enterprise attribute; assigning, on the backend computing device, the identified cloud attribute to the identified enterprise component; and converting, on the backend computing device, the enterprise component into a cloud executable cloud component, wherein resources of the cloud domain render the cloud component, thereby generating at least one part of the enterprise software application.

In another embodiment, a computer-implemented system for moving an enterprise software application from an enterprise environment to a cloud domain comprises a backend computing device for identifying at least one enterprise components from the enterprise software application; the backend computing device for assigning at least one enterprise component tag to each identified enterprise component; the backend computing device for assigning at least one enterprise attribute tag to the identified enterprise component; the backend computing device for identifying at least one cloud attribute for the enterprise attribute, wherein the cloud attribute shares a pre-defined relationship with the enterprise attribute; the backend computing device for assigning the identified cloud attribute to the identified enterprise component; and the backend computing device for converting the enterprise component into a cloud executable cloud component, wherein resources of the cloud domain render the cloud component, thereby generating at least one part of the enterprise software application.

BRIEF DESCRIPTION OF THE DRAWINGS

The accompanying drawings constitute a part of this specification and illustrate one or more embodiments of the disclosed system and methods, and further enhance the description thereof provided in this specification.

DETAILED DESCRIPTION

Figure 1:
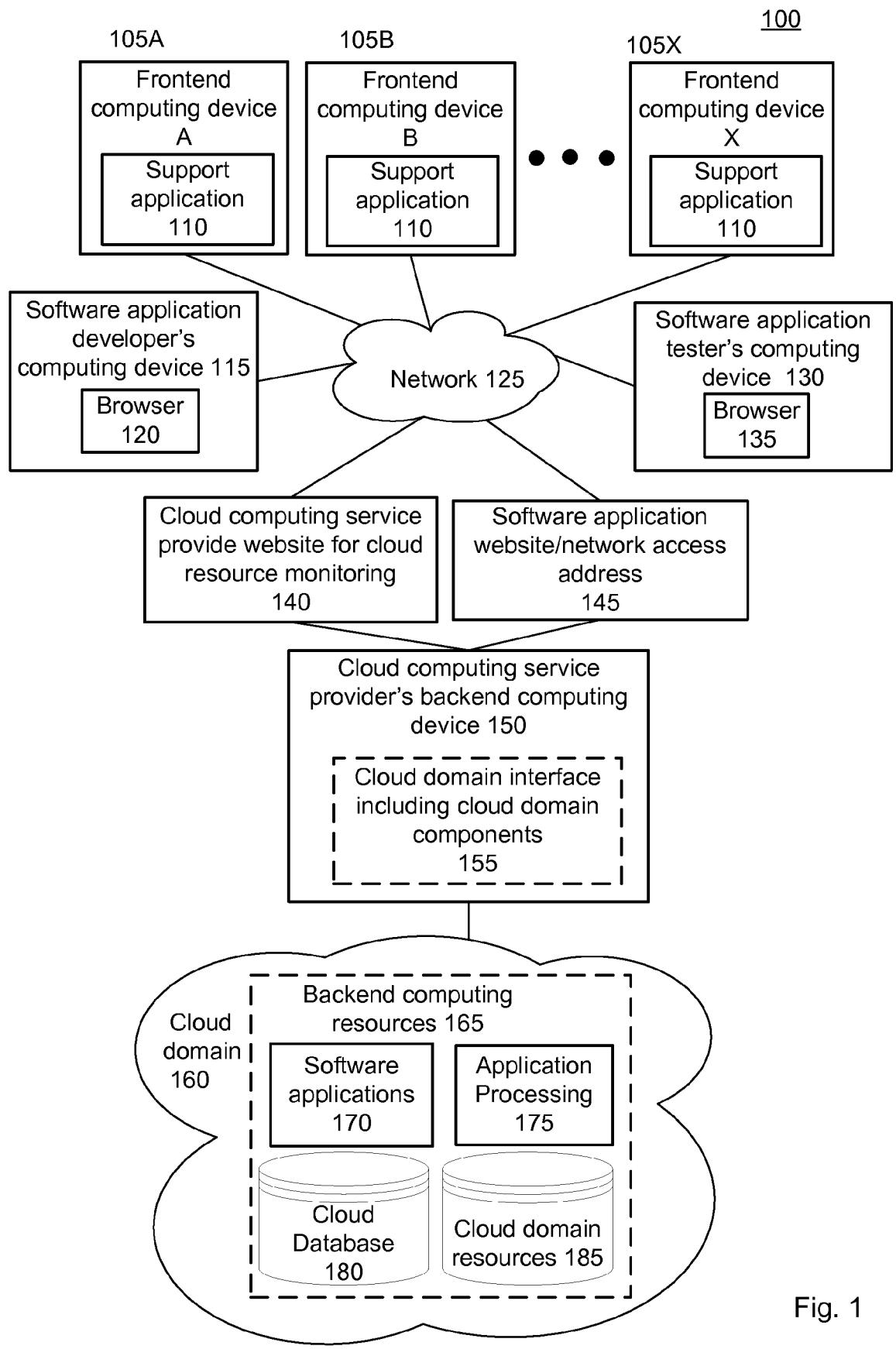
FIG. 1 illustrates a system for moving an enterprise software application from an enterprise environment to a cloud domain according to an exemplary embodiment.

Reference will now be made in detail to exemplary embodiments of the disclosed data center simulation application, examples of which are illustrated in the accompanying drawings.

Software applications for frontend computing devices can port to a virtual machine (VM) by converting the current operating system (OS) instance that performs the platform functions for the software application into a virtual machine image. In one example, the platform functions can perform the hardware-side processes for messages or signals from the overlying software application. The hardware side process may include memory assignment, priority queuing, function loading, and application execution among other functions for rendering the software application and performing the user input functions. The process of converting a software application from a physical device to a VM can initiate with an analysis of the physical computing device requirements from the software application perspective. The analyses can focus on the OS usage for the intended software application, including such information as the central processing unit (CPU) allocated, temporary memory (RAM) allocation, hard drive memory used, network information, and other connected hardware information (e.g., drivers, file systems, memory allocation, passwords, etc.).

The information from the analyses of the resource usage can represent how the OS on a physical device supports the overlying software application. The process of porting the software application may involve understanding the resource allocation from the analysis performed on the OS and hardware. The analyses of the OS and/or hardware usage information results in the creation of emulated native code, which replicates the hardware function allocation performed by the OS. The emulated code compiles or interprets on an emulator that serves as a virtual machine OS (VMOS) platform to interpret or compile any software application data and software application that renders within the VMOS platform into native machine code according to the requirements of the physical computing device that runs the VMOS. This process allows an OS and its related software applications to function as a virtual image on any computing device, with any type of hardware platform, and within any other existing operating system environment.

Computing devices and their respective operating systems (OS) may also support Java based user-interface applications for cloud computing on the client-side. In such applications, the Java based user-interface is a stand-alone web-enabled support application that communicates via standard internet protocol (IP) to remote devices over the internet, without the need for a browser. Cloud computing software applications can render within the support application on the frontend computing device, thereby providing the user with a user interface to the backend software application. By way of an example, a software application can render as a user interface image on a stand-alone support application (e.g., a Java application, or Python using Glade to design a user interface window) or a dynamic scripting language data file such as a dynamic hypertext markup language (DHTML) script, on a browser-type support application (e.g., Firefox® and Chrome®). The software applications in a cloud environment are can be defined within the cloud environment, where backend computing devices share physical hardware devices to host and process data. The cloud environment defines security of shared hardware space and supports scalability of resources based on user demands. The resources of a cloud domain include hardware, software, and personas, where personas are a VM images capable of rendering overlying software applications. Conversion of a software application from a physical environment to a cloud computing environment may involve complex configuration changes, including the retention of the underlying VM configuration in a shared physical space.

In an exemplary embodiment, a method and system of moving software applications to a cloud domain involves fragmenting of the software application into components, where each component is a software application file, including database files and script files, with specific functionality of the enterprise or VM software application. The term "component" may refer to computer-readable files at the lowest level of abstraction or modules, where modules may be a group of files at a higher level of abstraction. Further, attributes are determined for each component, where the attributes determine the structure of the software application in response to certain protocol requirements of the software application for full functionality. For example, an enterprise software application on a VM or an physical computing device may include such attributes as a database attribute, a security related attribute, a scalability attribute, an application attribute, a distribution attribute, and a user-interface attribute. Further, within each attribute, additional sub-attributes may exist for defining the finer details of the attribute. In certain exemplary embodiments, the database attribute includes a structure sub-attribute, an access sub-attribute, and an index sub-attribute for defining the database attribute or the structure of the database component. An automated moving software program can automate the entire moving process, thereby performing each of the steps disclosed herein for moving an enterprise software application to a cloud domain.

The attributes of the enterprise software application or VM software application may include some similarities with a set of cloud attributes of a software application on a cloud domain. In one example, a cloud domain may include such attributes as, an elasticity attribute, a self-service attribute, a utility attribute, a security attribute, and a ubiquity attribute. Further, similar to the enterprise software application attributes, each cloud attribute may include cloud sub-attributes. For example, the ubiquity attribute defines how a user on a frontend computing device may access the software application. The ubiquity attribute may include exemplary cloud sub-attributes that describe the types of frontend computing devices that may be used to access the software application and the network access information that may be different for different frontend computing devices.

The elasticity attribute defines computation capabilities that are variable depending on the requirements of the software application. The self-service attribute defines the functions that allow a user of the software application to request additional computational capabilities—either automatically or though manual intervention. The security attribute of the cloud domain defines access to the various attributes of a software application in the cloud domain. A cloud domain typically stores a cloud-based software application on multiple backend computing devices. Further, it is common for some cloud-based software applications to share cloud domain resources with unrelated third-party software applications. The security attribute controls access of such shared software application areas, database areas, and network use.

In an exemplary embodiment, software applications on physical computing devices may be moved to a virtual machine environment prior to moving them to a cloud domain environment. The move to a virtual machine environment prior to a cloud environment provides the cloud computing service provider and the software application developer with an understanding of the resource utilization of the software application in terms of operating system (OS) and hardware usage. In an exemplary embodiment, constituent components of the enterprise software application are identified, whereby each component is supported by one or more attributes of the enterprise environment. An accounting software can combine components, such as combining a database component with a security subcomponent for the database, application processing components, networking components, a user-interface component, and other related software components, which include files that render and reference each other to form the software application. The database component may be assigned a database attribute and a scalability attribute depending on the number of simultaneous users that are allowed to access the database. The attribute itself can include an attribute value, where the attribute value provides a reference factor to differentiating an associated component which functions within multiple attributes.

The components may include subcomponents, where, in one example, the database component may include subcomponent modules for indexing, security, searching, etc. To initiate the movement of enterprise software application to a cloud, the components as well as any subcomponents of the enterprise software application may be identified. Attributes can be identified for each of the components and subcomponents. Multiple attributes may be assigned to each of the components and subcomponents. An automated moving software program creates a map for extending the enterprise software application attributes to the cloud software application attributes. The automated moving software program can track new functionalities of the cloud domain resources, such as new software applications, where the new software application is capable of rendering new file formats. Each of the cloud domain attributes are applied to the enterprise software application components, thereby enabling the porting of the enterprise software application components to their respective cloud components within the cloud resources.

The cloud resources include a cloud database resource, a cloud application processing resource, a cloud software applications resource, and a cloud domain resource. A backend computing device provides a software application developer with a cloud domain interface, which includes cloud domain components retrieved from the cloud domain resources of the same or a different cloud-based backend computing device. The software application developer can monitor software application deployment, cloud domain resource utilization, fees, service level agreements (SLAs), and other related information on the cloud domain interface. The cloud domain interface can transmit to the software application developer's frontend computing device via a cloud computing service provider website.

The software application developer can set automated resources to the cloud domain usage for a particular software application, where the automated moving software program automatically provisions the cloud resources as needed by a cloud software application. The cloud domain interface can control and respond to developer requests for transition of an enterprise software application to the cloud domain. When the software application owner/developer makes such a request, the backend computing devices of the cloud computing service provider initiate an automated moving software program that analyzes the enterprise application and identify its various components. The components are then assigned enterprise attributes based on the recognition of the components by the automated moving software. The automated moving software program can recognize the components of the enterprise application by parsing and reviewing the files associated with the enterprise application, thereby separating the enterprise software application files into application script files, database files, data file, music files, user-interface files, error logs, and other types of files for attaching attributes.

Each type of file separated from the enterprise application can be assigned an enterprise component tag. When a certain enterprise component file has references to other files in the same enterprise component group, the other files may be classified as enterprise subcomponents. The enterprise components are then automatically assigned enterprise attributes based on the links between the enterprise components to other enterprise component group files or to files within the same enterprise component group. The automated moving software program may uses the enterprise attribute to cloud attribute maps to tag the enterprise components with cloud attributes tags. Depending on the cloud attribute tags, the enterprise components may be retained with new cloud component tags, translated into scripts that are supported by the cloud based software, or used to create entirely new components optimized for the cloud domain software application. During creation of the relationship mapping of cloud and enterprise attributes, the term "component" may refer to file types (or file formats), where the file types may be used to determine the type of components that may render on the cloud domain resources.

The same enterprise components or the newly scripted cloud components can be loaded as cloud components of the respective cloud domain resources, where each cloud domain resource includes support software, hardware, and network architecture to support rendering of the particular cloud components. The rendered cloud components are mapped as the newly ported software application resident on the cloud domain resources of the cloud computing service provider. The database cloud components are mapped to the cloud database and may contribute the data portion of the ported cloud software application. The application processing section of the cloud domain resources retrieve the cloud component application script files from the software application storage area and render the cloud component application script files according to the requirements of the ported software application.

FIG. 1 illustrates an exemplary system 100 for moving an enterprise software application from an enterprise environment to a cloud domain according to certain exemplary embodiments. A software application developer uses a web-browser support application 120 on the software application developer's computing device 115 which may have similar hardware and software capabilities as the frontend computing devices 105A-X to communicate with a cloud computing service provider's developers' website 140. The website 140 for developers and testers may be used to remotely develop software applications, move an enterprise software application or control cloud resources, and perform quality assessment (QA) tests on new software applications. The developers and testers' website 140 present developers with a user-interface for developing and testing software application, moving or porting enterprise software applications, and arranging cloud resource configurations for new and existing cloud based software applications.

A user on the frontend computing device 105A-X uses a support application 110 to access the services of a cloud based software application from the software application's backend computing device. The support application 110 can be a browser or a stand-alone cloud computing viewer, such as a Java based viewer. A chosen software application 170 resident in the cloud domain 160 is retrieved in a script format for rendering on a VM device on the backend computing resources 165. A user-interface image or a user-interface software coded file associated with the software application may be sent to render on the support application 110 of the user's frontend computing device 105. When the user on the frontend computing device 105 opens the software application website 145 on a browser window 110 (where the support application is a browser), the user-interface software coded file (e.g., a DHTML) file from the software application storage 170 generates a user-interface webpage to interface with the software application.

Any changes made by the user to the DHTML webpage can be automatically transmitted via network 125 to the backend computing resources 165, and more particularly, to the software application running over a VM on the resources 165. As a failsafe, the changes made by the user simultaneously save into the application data database 180 periodically, so that the user does not lose any work input. A software application tester may use computing device 130 and a supported browser 135 to access the developers and testers website 140 for access to the cloud domain interface 155. The network address access 140 and 145 represent a direct secure login method that can be applied to stand-alone web-enabled applications, e.g., Java, Perl, and Python based applications used to access the cloud domain interface 155, without the need for a browser.

A software application developer may provide, via a file upload on the cloud computing service provider's website, to the cloud computing service provider 150 an existing enterprise software application for porting to the service provider's backend computing resources 165. The automated moving software program in the backend computing device 150 analyzes the enterprise software application for enterprise components and subcomponents. Following processing, the enterprise components and subcomponents are converted into cloud components and subcomponents, each cloud component and subcomponent capable of being rendered on the cloud domain resources 185 of the backend computing resources 165. The components and subcomponents are stored in the software application 170 area of the backend computing resources 165 prior to deployment based on user requests for the ported software application from frontend users on the frontend computing device 105.

Figure 2:
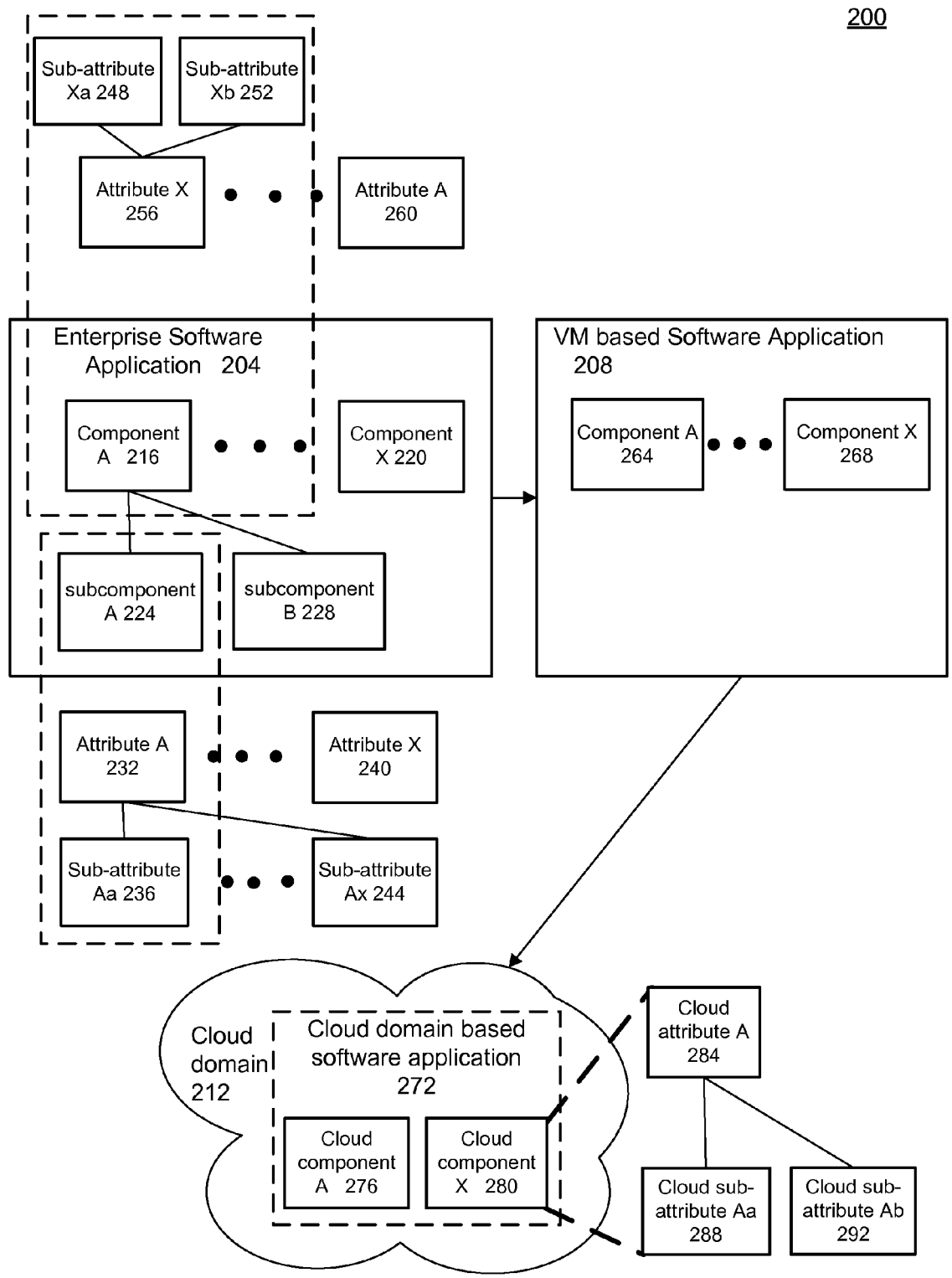
FIG. 2 illustrates a system for moving an enterprise software application from an enterprise environment to a cloud domain according to an exemplary embodiment.

FIG. 2 illustrates an exemplary system 200 for moving an enterprise software application from an enterprise environment to a cloud domain according to certain exemplary embodiments. An enterprise software application 204 includes components 216-220 and subcomponents 224 and 228. The components and subcomponents of the enterprise software application will herein be referred to as enterprise components and enterprise subcomponents. The enterprise components and enterprise subcomponents may represent group tags attached to script files that render the enterprise software application. By way of an example, a database file including the software application's user data is a database enterprise component. If the database file is associated with profile file for restricting user's access to the database file in the enterprise software application, then the profile file is tagged with a security enterprise subcomponent tag within the database enterprise component tag. Based on the enterprise component tag, enterprise attribute tags 232 and 240 and sub-attribute tags 236 and 244 are attached to each enterprise software application file.

The enterprise attribute and sub-attribute tags can be associated with enterprise component and subcomponents groups assigned to each enterprise component file. The attributes tie the software application enterprise components to software functions and capabilities. The scalability, elasticity, utility, and on-demand self-service options of each component may be defined by the attributes. A database component may desire high scalability and on-demand self-service options during heavy data periods. The two attributes can therefore be assigned to the component, and may provide additional purpose to the component by including numerical values representing the importance of the attribute to the component.

The enterprise software application 204 is completely transferred to a VM software application using the virtualization methods disclosed above to retrieve the underlying OS and hardware resource usage for an overlying software application. Components 264-268 are VM based software application components that may include certain programmable function calls targeted to the emulator underlying the VM software application, whereby the programmable function calls help to improve the speed of rendering by various emulator optimization methods. The identified enterprise components and attributes are used to create the cloud-based version of the enterprise software application by using a map of the enterprise attributes and cloud attributes 284-292 to identify cloud resources that are capable of rendering each identified component. The cloud based version of the enterprise software application will herein be referred to as the cloud software application. The cloud software application may include the original enterprise components and subcomponents 264-268 from the VM or newly created cloud components and subcomponents 276-280. The newly created components and subcomponents 276-280 are generated if the resources of the cloud domain 212 are unable to render the original enterprise components.

Figure 3:
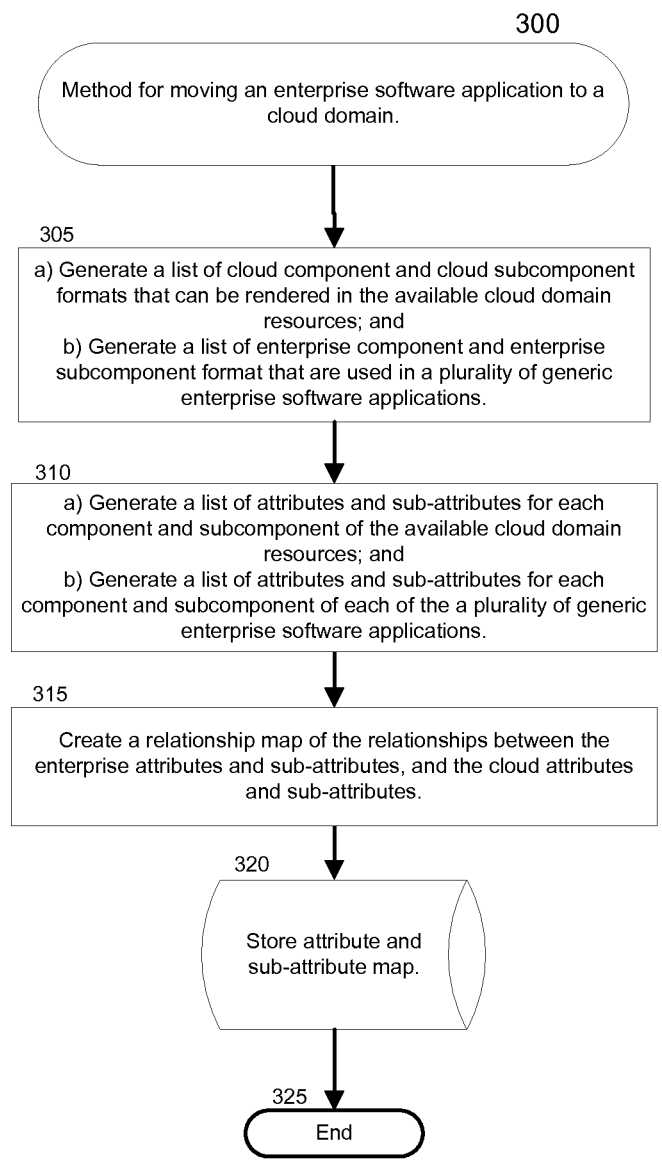
FIG. 3 illustrates a method for creating attribute maps to enable the porting of an enterprise software application from an enterprise environment to a cloud domain according to an exemplary embodiment.

FIG. 3 illustrates an exemplary method 300 for creating attribute maps to enable the porting of an enterprise software application from an enterprise environment to a cloud domain. The attribute maps may be a reference table of cloud attributes and sub-attributes against enterprise attributes and sub-attributes. The attribute maps are pre-defined relationships between possible enterprise attributes and suggested cloud attributes. The attribute maps are initiated by generating component and subcomponent formats that can be rendered by the available cloud domain resources. Further, a list of enterprise component and subcomponent formats are generated based on a plurality of generic enterprise software applications available in the market. This process is illustrated in block 305. This list provides the cloud computing service provider with all possible formats and software platforms that may be used by the cloud domain resources to enable an existing enterprise software application to run on the cloud domain resources.

In block 310, cloud attributes and sub-attributes of the cloud domain are generated for the list of the components and subcomponent formats generated in block 305. Further, enterprise attributes and sub-attributes are generated for each component and subcomponents of a number of generic enterprise software applications. Exemplary enterprise attributes may include user-interface attributes, security attributes, scalability attributes, database attributes, and distribution attributes. Cloud attributes may include cloud database attributes, application processing attributes, and cloud resources and provisioning attributes.

In block 315, a relationship map is created to match enterprise attributes and sub-attributes to cloud attributes and sub-attributes. The map of cloud attributes and sub-attributes to enterprise attributes and sub-attributes may typically provide guidance on how a scalability attribute of the enterprise attribute set may fit within the cloud attribute set. In one example, the enterprise scalability attribute may be mapped to the cloud resources and provisioning attribute of the cloud attribute set. The cloud attributes may map to more than one enterprise attribute and vice-versa. In an alternative embodiment, the mapping of attributes may be weighed if one attribute of cloud set maps to more than one attribute in the enterprise set.

From the mapping process, the underlying components, and subcomponents of the enterprise attributes list that have been mapped to the cloud attributes are taken to be deployable via the cloud resource represented by the mapped cloud attribute. In one example, if a database component of the enterprise software application is tagged with a database enterprise attribute and a security enterprise attribute, the mapping process may match the database enterprise attribute and a security enterprise attribute, independently, to the cloud database attribute and the application processing attribute. The cloud database attribute references a list of cloud components that can render components within the cloud database attribute. The cloud component is therefore tagged to the enterprise component underlying the matched enterprise attribute. In block 320, the relationship maps can be stored in the cloud domain resources or the service provider's backend computing device for use by the service provider or the automated software program that performs the functions to move the software application. Block 325 concludes the method 300 after each of the enterprise software applications selected for porting to a cloud domain and ported over, and the attribute and sub-attribute maps are generated.

The cloud domain interface that is accessible to a software application developer via the service provider's website can include a tutorial on the moving process, with a step-by-step window on a browser of a support application, thereby taking the software application developer through the automated process of moving an uploaded enterprise software application.

Figure 4:
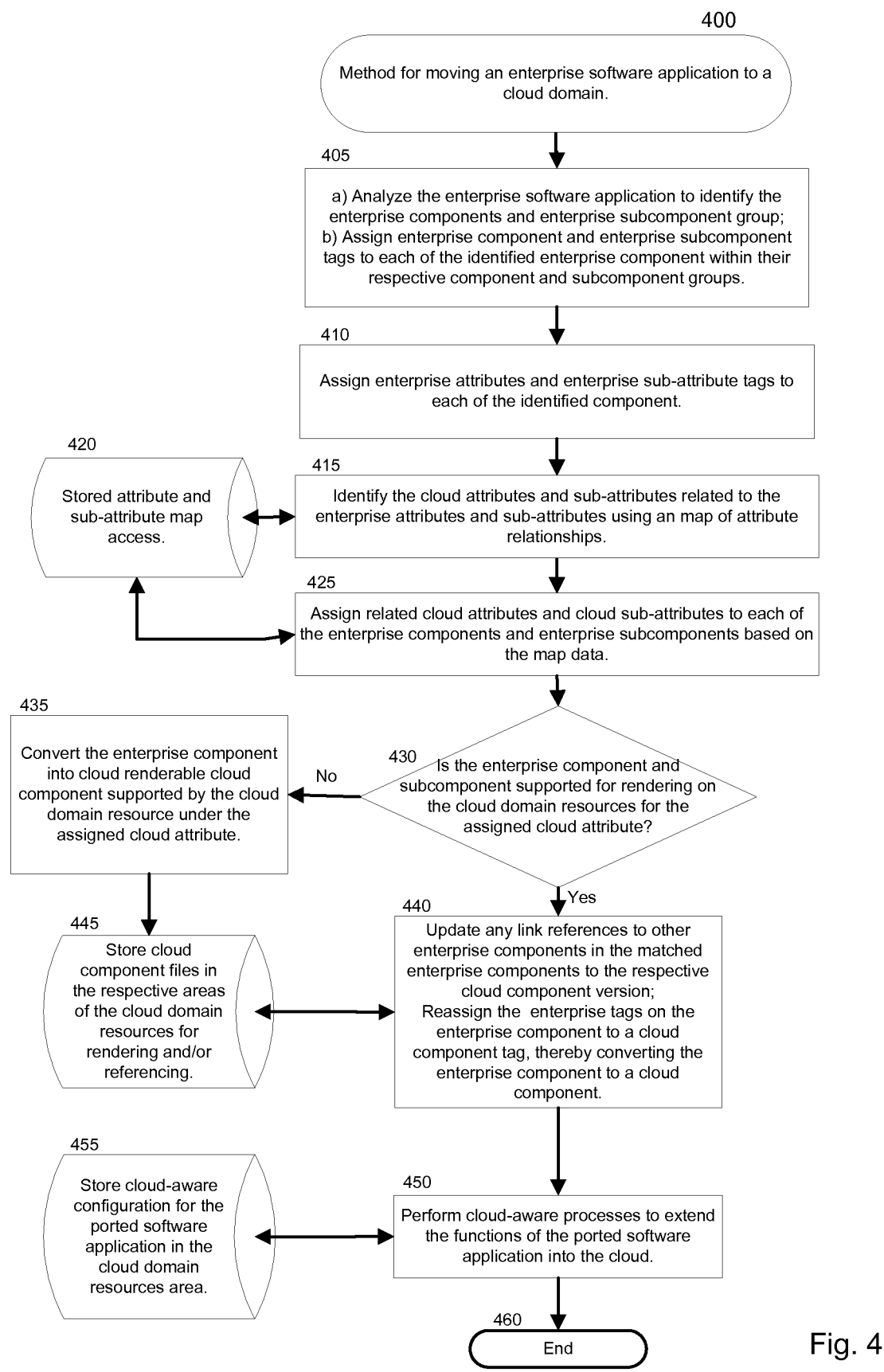
FIG. 4 illustrates a method for moving an enterprise software application from an enterprise environment to a cloud domain according to an exemplary embodiment.

FIG. 4 illustrates a method 400 for moving an enterprise software application from an enterprise environment to a cloud domain. An analysis is performed on an intended enterprise software application, where the enterprise software application is to be moved to a cloud domain. In block 405, the analysis is performed to identify and assign tags on the enterprise components and subcomponents. Block 410 constitutes a part of the automated moving software program that assigns enterprise attributes and sub-attributes to the enterprise components and subcomponents identified and tagged in block 405. Attribute and mapping data stored in the cloud domain resources or at the backend computing device of the cloud computing service is accessed from the storage area via block 420. The enterprise to cloud attributes mapping information is used to identify relationships between the assigned enterprise attributes and sub-attributes from block 410 and the available attributes maintained by the cloud domain resources.

A match in the enterprise attributes with the cloud attributes causes block 425 of the automated moving software program to assign cloud attributes and sub-attributes to the enterprise components and subcomponents underlying the matched enterprise attributes and sub-attributes. A verification is performed in block 430 to determine if the enterprise component and subcomponent are supported for rendering on the cloud domain resources using the assigned cloud attribute. For example, if a Java file is presented as an enterprise component for a user-interface enterprise attribute, the Java file may match a cloud attribute for application processing, where the match implies that the underlying cloud components for the application processing cloud attribute support Java compilers on the cloud domain resources.

In one example, a "no match" of the cloud and domain attributes for an enterprise component triggers block 435 to convert the enterprise component into a cloud render-able cloud component. This process may include creating a new cloud component to replicate the function of the enterprise component. In the case of match in the cloud and domain attributes for an enterprise component, the link references to other enterprise components in the matched enterprise component are updated with the path reference to the cloud component version of each respective enterprise component. Further, the enterprise component tag is removed from the matched enterprise component and a new cloud component tag is attached to the matched enterprise component. This process is performed in block 440, thereby retaining the same enterprise component as a cloud component. The new cloud components are stored in the cloud domain resources for use by the ported software application, when the porting is completed.

The cloud component files can be stored in the cloud domain resources depending on the type of cloud component file, as implemented by block 445. Exemplary cloud component file types include software application executable files and database files. Further, in certain exemplary embodiments, the automated moving software program can perform a further step of converting the ported software application into a fully cloud-aware application, as implemented in block 450. The process involves supporting cloud based functionalities such as rapid elasticity of the ported software application on the cloud domain resources, measured services as applicable to a pay-per-use of the ported software application, and on-demand self-service of the ported software application. The elasticity component of cloud-aware processes may be supported by the cloud domain interface using cloud provisioning applications to automatically scale in and out additional cloud domain resources, while measured services and self-service functions may be implemented by application programming interface (API) calls stored and accessible via block 455. The API calls perform listening functions to monitor usage of the ported software application. The API functions in a cloud domain interface may be used to manually request additional cloud domain resources if the number of instances of a cloud software application increases beyond a pre-determined threshold. Block 460 concludes the method 400 of moving an enterprise software application to a cloud domain.

The exemplary methods and systems described in this disclosure are illustrative, and, in alternative embodiments, certain steps can be performed in a different order, in parallel with one another, omitted entirely, and/or combined between different exemplary embodiments, and/or certain additional acts can be performed, without departing from the scope and spirit of this disclosure. Accordingly, such alternative embodiments are included in the inventions described herein.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," and "programs" are software codes used interchangeably for the purposes of simplicity in this disclosure. Further, "memory" and storage can include such media as, floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for moving an enterprise software application from an enterprise environment to a cloud domain, the method comprising:

identifying, on a backend computing device, an enterprise component from the enterprise software application;

assigning, on the backend computing device, at least one enterprise component tag to the identified enterprise component;

assigning, on the backend computing device, at least one enterprise attribute tag to the identified enterprise component;

identifying, on the backend computing device, at least one cloud attribute for an enterprise attribute, wherein the cloud attribute shares a pre-defined relationship with the enterprise attribute;

assigning, on the backend computing device, the identified cloud attribute to the identified enterprise component; and converting, on the backend computing device, the enterprise component into a cloud executable cloud component, wherein resources of the cloud domain render the cloud component, thereby generating at least one part of the enterprise software application;

wherein the cloud attribute comprises at least one attribute selected from the group consisting of an elasticity attribute, a self-service attribute, a utility attribute, a security attribute, and a ubiquity attribute; and wherein the enterprise attribute comprises at least one attribute selected from the group consisting of a user-interface attribute, a security attribute, a scalability attribute, a database attribute, and a distribution attribute.

2. The method according to claim 1, wherein the enterprise component comprises sub-components.

3. The method according to claim 1, wherein the enterprise component and the cloud component are computer-coded files.

4. The method according to claim 1, wherein the enterprise component and the cloud component are computer-coded file formats.

5. The method according to claim 1, wherein the pre-defined relationship with the enterprise attribute is based on analysis of type of file formats that is render-able by the resources of the cloud domain.

6. The method according to claim 1, further comprising:
processing the converted cloud component into add cloud functionality into the cloud component, wherein the cloud functionality includes at least one function selected from:
 a) elastic scaling the cloud domain resources available to the converted cloud component;
 b) measured service pay-per-use related to a user's frontend use of the enterprise software application comprising the converted cloud component; and
 c) on-demand self-service to a user of the enterprise software application comprising the converted cloud component, wherein on-demand self-service refers to a service of providing the enterprise software application to a user with additional cloud domain resources based on the user's request for the enterprise software application and additional cloud domain resources.

7. The method according to claim 1, wherein the cloud domain resources include at least one among hardware resources, software resources, or personas.

8. The method according to claim 1, wherein converting the enterprise component into a cloud render-able cloud component is performed by
 a) generating a new cloud component to replicate at least one function of the enterprise component, wherein the new cloud component is capable of rendering within the cloud domain resources, and providing the new cloud component in the place of the enterprise component to the enterprise software application as part of the enterprise software application to be rendered on the cloud domain resources; or
 b) retaining the same enterprise component, wherein the retained enterprise component includes additional functionalities of the cloud domain resources.

9. A computer-implemented system for moving an enterprise software application from an enterprise environment to a cloud domain, the system comprising:
a backend computing device that identifies at least one enterprise components from the enterprise software application;

the backend computing device that assigns at least one enterprise component tag to the identified enterprise component;

the backend computing device that assigns at least one enterprise attribute tag to the identified enterprise component;

the backend computing device that identifies at least one cloud attribute for an enterprise attribute, wherein the cloud attribute shares a pre-defined relationship with the enterprise attribute;

the backend computing device that assigns the identified cloud attribute to the identified enterprise component; and the backend computing device that converts the enterprise component into a cloud executable cloud component, wherein resources of the cloud domain render the cloud component, thereby generating at least one part of the enterprise software application;

wherein the cloud attribute comprises at least one attribute selected from the group consisting of an elasticity attribute, a self-service attribute, a utility attribute, a security attribute, and a ubiquity attribute; and wherein the enterprise attribute comprises at least one attribute selected from the group consisting of a user-interface attribute, a security attribute, a scalability attribute, a database attribute, and a distribution attribute.

10. The system according to claim 9, wherein the enterprise component comprises sub-components.

11. The system according to claim 9, wherein the enterprise component and the cloud component are computer-coded files.

12. The system according to claim 9, wherein the enterprise component and the cloud component are computer-coded file formats.

13. The system according to claim 9, wherein the pre-defined relationship with the enterprise attribute is based on analysis of type of file formats that is render-able by the resources of the cloud domain.

14. The system according to claim 9, further comprising:
processing the converted cloud component into add cloud functionality into the cloud component, wherein the cloud functionality includes at least one function selected from:
  a) elastic scaling the cloud domain resources available to the converted cloud component;
  b) measured service pay-per-use related to a user's frontend use of the enterprise software application comprising the converted cloud component; and
  c) on-demand self-service to a user of the enterprise software application comprising the converted cloud component, wherein on-demand self-service refers to a service of providing the enterprise software application to a user with additional cloud domain resources based on the user's request for the enterprise software application and additional cloud domain resources.

15. The system according to claim 9, wherein the cloud domain resources include at least one among hardware resources, software resources, or personas.

16. The system according to claim 9, wherein converting the enterprise component into a cloud render-able cloud component is performed using
  a) generating a new cloud component to replicate at least one function of the enterprise component, wherein the new cloud component is capable of rendering within the cloud domain resources, and providing the new cloud component in the place of the enterprise component to the enterprise software application as part of the enterprise software application to be rendered on the cloud domain resources; or
  b) retaining the same enterprise component, wherein the retained enterprise component includes additional functionalities of the cloud domain resources.

* * * * *